(12) United States Patent
Yudenfriend et al.

(10) Patent No.: US 6,338,145 B1
(45) Date of Patent: *Jan. 8, 2002

(54) INPUT/OUTPUT RECOVERY SYSTEM WHICH IS BASED UPON AN ERROR RATE AND A CURRENT STATE OF THE COMPUTER ENVIRONMENT

(75) Inventors: Harry Morris Yudenfriend; John Andrew Staubi, both of Poughkeepsie, NY (US); Michael G. Fitzpatrick, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/138,104

(22) Filed: Aug. 21, 1998

(51) Int. Cl.$^7$ .......................... H02H 3/05; H03K 19/003
(52) U.S. Cl. .............................................. 714/2; 714/15
(58) Field of Search .......................... 714/2, 5, 15, 16, 714/47

(56) References Cited

U.S. PATENT DOCUMENTS

| | | | |
|---|---|---|---|
| 3,916,379 A | | 10/1975 | Dulaney et al. .. 340/146.1 A X |
| 4,380,067 A | * | 4/1983 | Beardsley et al. ............. 714/4 |
| 4,878,049 A | | 10/1989 | Ochiai et al. ................. 371/5.5 |
| 5,197,069 A | | 3/1993 | Cook et al. ..................... 371/7 |
| 5,231,631 A | | 7/1993 | Buhrke et al. ................. 370/60 |
| 5,271,011 A | * | 12/1993 | McMullan, Jr. et al. .... 714/807 |
| 5,377,311 A | * | 12/1994 | Carlock et al. ............. 395/115 |
| 5,383,188 A | | 1/1995 | Shigemoto ............... 370/105.2 |
| 5,388,254 A | | 2/1995 | Betz et al. .................. 395/575 |
| 5,491,687 A | | 2/1996 | Christensen et al. .......... 370/17 |
| 5,541,955 A | * | 7/1996 | Jacobsmeyer ................ 375/222 |
| 5,568,650 A | * | 10/1996 | Mori ............................. 710/52 |
| 6,049,570 A | * | 4/2000 | Fukunaga et al. ........... 375/240 |
| 6,072,595 A | * | 6/2000 | Yoshiura et al. ............ 358/400 |

OTHER PUBLICATIONS

IBM Manual, Enterprise Systems Architecture/390, Common I/O–Device Commands and Self Description, SA22–7204–02.

IBM Manual, Enterprise Systems Architecture/390, Principals of Operation, SA22–7201–04.

IBM Manual, MVS/ESA, Component Logive: I/O Supervision, MVS/ESA System Product, JES2 Version 4, JES3 Version 4, ZZ28–7035–02.

IBM Manual, OS/390, MVS Data Areas, vol. 3 (IVT—RCWK), SY28–1166–04.

"Multiple Path Storage Director," International Business Machines Corporation Technical Disclosure Bulletin, vol. 32, No. 11, pp. 153–154 (Apr. 1990).

* cited by examiner

Primary Examiner—Dieu-Minh Le
(74) Attorney, Agent, or Firm—Lawrence D. Cutter, Esq.; Blanche E. Schiller, Esq.; Heslin Rothenberg Farley & Mesiti P.C.

(57) ABSTRACT

Error recovery is performed when an error rate for a subsystem of a computer environment (e.g., an Input/Output (I/O) subsystem) is greater than a predefined value and a critical resource of the computer environment (e.g., storage) is experiencing a shortage. Error recovery may include slowing down activity of the devices associated with the subsystem and/or simulating errors for the subsystem. The simulation of the errors does not require a large block of additional storage, and thus, the shortage situation is not exacerbated.

22 Claims, 8 Drawing Sheets fig. 1 fig. 3 fig. 4 fig. 5 fig. 6 fig. 7 fig. 8

INPUT/OUTPUT RECOVERY SYSTEM WHICH IS BASED UPON AN ERROR RATE AND A CURRENT STATE OF THE COMPUTER ENVIRONMENT

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"INPUT/OUTPUT RECOVERY METHOD WHICH IS BASED UPON AN ERROR RATE AND A CURRENT STATE OF THE COMPUTER ENVIRONMENT," by Fitzpatrick et al., Ser. No. 09/137,947, and "INPUT/OUTPUT RECOVERY WHICH IS BASED UPON AN ERROR RATE AND A CURRENT STATE OF THE COMPUTER ENVIRONMENT," by Fitzpatrick et al., Ser. No. 09/137,997.

TECHNICAL FIELD

This invention relates, in general, to processing within a computer environment and, in particular, to determining error conditions within the computer environment and to recovering from those error conditions.

BACKGROUND ART

Increasing pressure to provide highly available and continuously available computer systems places a great deal of emphasis on error detection and recovery. It is very important for errors to be detected and for recovery to be performed before the computer system crashes or is otherwise seriously impacted.

There are various types of errors and even more types of recovery processes. For example, missing interrupts and hot input/outputs (I/Os) are just two types of error conditions recognized by the Multiple Virtual Storage (or OS/390) operating system offered by International Business Machines Corporation.

A missing interrupt is an error that indicates that an input/output request has been initiated, but no response has been received for the request. A missing interrupt can be symptomatic of many different types of problems and there are different recovery processes to cover those different types of problems.

A hot I/O condition occurs when there are continuous unsolicited I/O interrupts. These interrupts are typically caused by an I/O device, control unit or channel path. Thus, recovery processes are provided to isolate and try to recover the cause of the interrupts.

There are also other types of errors that do not fall within the above categories. These errors, as well as the above errors, may cause critical system resources to become exhausted, thereby causing the computer system to crash. This is particularly devastating when several computer systems are coupled to one another and all of the systems crash.

Therefore, a need exists for an enhanced recovery capability that takes into account different types of errors. Further, a need exists for a recovery capability that monitors critical system resources, and takes action to avoid exhaustion of those resources. A yet further need exists for a recovery capability that provides enhanced system availability.

SUMMARY OF THE INVENTION

The shortcomings of the prior art are overcome and additional advantages are provided through the provision of a system of recovering from errors in a computer environment. The system includes, for instance, means for determining whether an error rate is above a predefined threshold; means for determining whether there is at least a potential shortage of a resource of the computer environment; and means for performing a recovery action when the error rate is above the predefined threshold and there exists at least a potential for the shortage.

In one example, the error rate is associated with a subsystem of the computer environment, and the system includes means for computing the error rate.

In a further example, the recovery action includes one of the following: simulating status of an error detected for the subsystem, in which the simulating is devoid of a need for a large amount of the resource; and slowing down activity to the subsystem.

In yet a further embodiment, the simulating includes means for performing one or more functions depending on the type of error. For instance, if the error is a channel error, a permanent error condition is indicated. Similarly, if the error is a unit check, a permanent error condition is indicated, and a selective reset is issued at a device of the subsystem. Further, if the error is an unsolicited error, an unsolicited device end indicator is set, and an isolation routine for a component of the subsystem is invoked.

In a further aspect of the present invention, a system of recovering from errors in a computer environment is provided. The system includes, for example, means for determining whether an error rate is above a predefined threshold; means for determining whether a resource of the computer environment is below a predetermined threshold; and means for performing a recovery action when the error rate is above the predefined threshold and the resource is below the predetermined threshold.

In yet a further aspect of the present invention, a system of recovering from errors in a computer environment is provided, in which the system includes, for instance, a processing unit adapted to determine whether an error rate is above a predefined threshold and to determine whether there is at least a potential shortage of a resource of the computer environment. Further, the processing unit is further adapted to perform a recovery action when the error rate is above the predefined threshold and the at least potential shortage exists.

In yet a further aspect of the present invention, a system of recovering from errors in a computer environment is provided. The system includes, for instance, a processing unit adapted to determine whether an error rate is above a predefined threshold, to determine whether a resource of the computer environment is below a predetermined threshold, and to perform a recovery action when the error rate is above the predefined threshold and the resource is below the predetermined threshold.

The error recovery capability of the present invention advantageously takes into account different types of error conditions. Additionally, it monitors critical system resources, and takes action to avoid exhaustion of those resources. The error recovery capability of the present invention advantageously uses a statistical threshold of the number of errors over time for deciding when a device is abnormally disrupting the computer environment. Further, the present invention is able to quiesce activity at a subsystem level. Additionally, the present invention advantageously limits any outages to those applications and subsystems using the devices in error. Thus, the present invention provides enhanced system availability.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a recovery capability is provided, which takes into consideration an error rate and a current state of a critical system resource in determining whether a recovery action is needed. The error rate is the rate for a subsystem of the computer environment and each subsystem has its own rate. Thus, recovery is on a subsystem basis. The recovery action to be taken can include quiescing activity to the subsystem and/or simulating status of errors of the subsystem.

Figure 1:
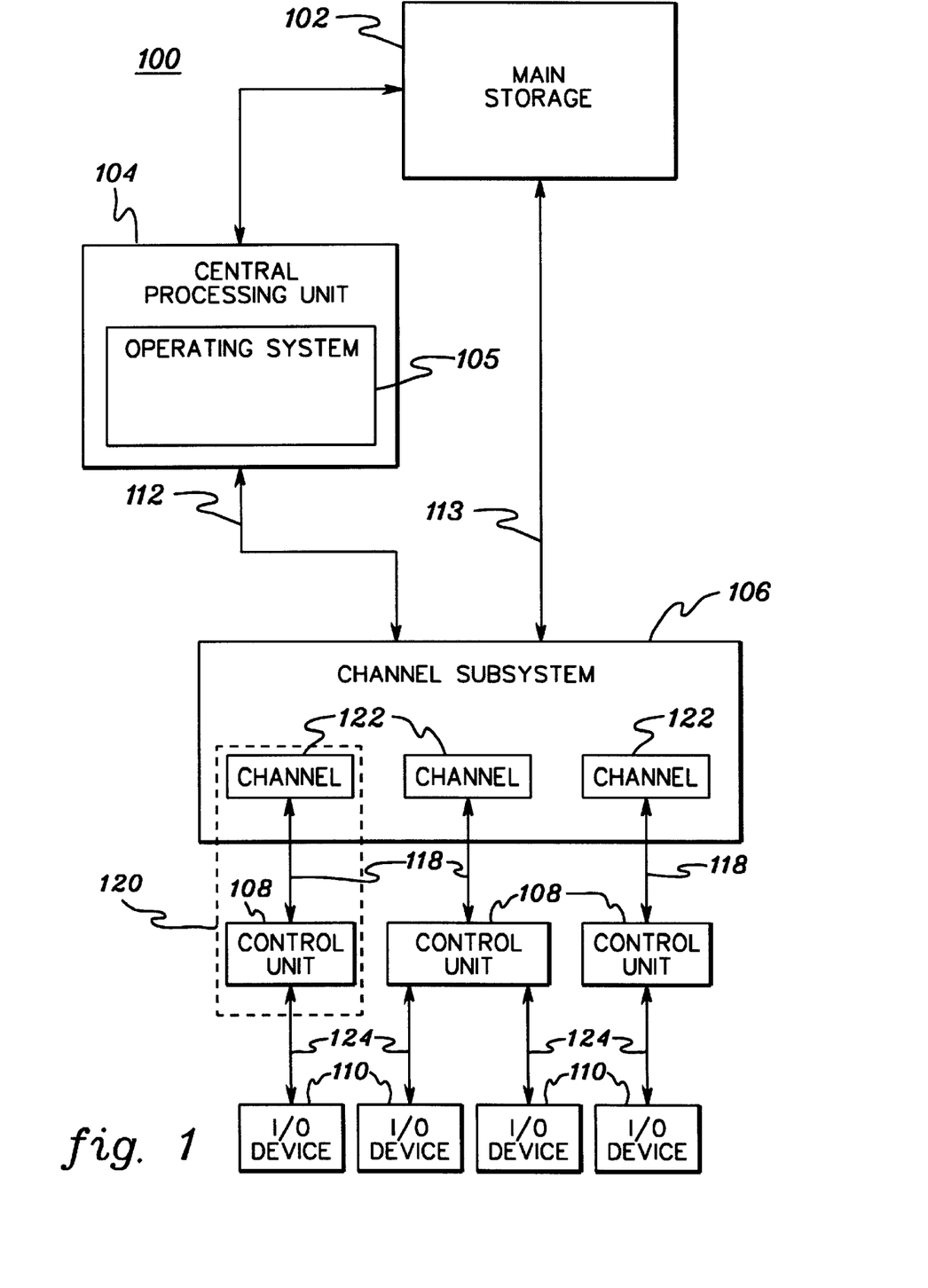
FIG. 1 depicts one example of a computer environment that may incorporate and use the recovery capability of the present invention.

One example of a computer environment that may incorporate and use the recovery capability of the present invention is described in detail with reference to FIG. 1. In this particular embodiment, computer environment 100 is based upon the Enterprise Systems Architecture (ESA) offered by International Business Machines Corporation. ESA is described in the following references: "Enterprise Systems Architecture/390 Principles of Operation", IBM Pub. No. SA22-7201-04, June 1997; and "Enterprise Systems Architecture/390 Common I/O Device Commands", IBM Pub. No. SA22-7204-02, August 1995, each of which is hereby incorporated herein by reference in its entirety.

As one example, computer environment 100 includes a main storage 102, one or more central processing units 104, a channel subsystem 106, one or more control units 108 and one or more input/output (I/O) devices 110, each of which is described below.

Main storage 102 stores data and programs, which are input from input devices 110. Main storage 102 is directly addressable and provides for high-speed processing of data by central processing unit 104 and channel subsystem 106.

Coupled to main storage 102 is central processing unit (CPU) 104, which is the controlling center of computer environment 100. As is known, central processing unit 104 executes at least one operating system 105, which is used to control the operation of the computer environment by controlling execution of other programs, controlling communication with peripheral devices and controlling use of the computer resources. Further, in accordance with the principles of the present invention, operating system 105 is enhanced with the recovery capabilities of the present invention.

One example of an operating system, which may include the capabilities of the present invention, is the Multiple Virtual Storage (or OS/390) operating system offered by International Business Machines Corporation.

Central processing unit 104 is coupled to channel subsystem 106 via a connection 112 (e.g. a bus or a link). Further, channel subsystem 106 is coupled to main storage 102 via a connection 113. (In another embodiment, a storage control element is disposed between the channel subsystem, and the CPU and main storage, such that the CPU, main storage and channel subsystem are all coupled to the storage control element. The storage control element is responsible for the queuing and execution of requests made by the central processing unit and the channel subsystem.) The channel subsystem directs the flow of information between input/output devices 110 and main storage 102. It relieves the central processing unit of the task of communicating directly with the input/output devices and permits data processing to proceed concurrently with input/output processing. The channel subsystem uses one or more channel paths 120 as the communication links in managing the flow of information to or from input/output devices 110. As a part of the input/output processing, channel subsystem 106 also performs the path-management function of testing for channel path availability, selecting an available channel path and initiating execution of the operation with the input/output device.

Each channel path 120 includes a channel 122 (located within the channel subsystem), one or more control units 108 and one or more serial links 118. (In another example, it is also possible to have one or more dynamic switches as part of the channel path. A dynamic switch is coupled to a channel and a control unit and provides the capability of physically interconnecting any two links that are attached to the switch.)

Also located within channel subsystem 106 are subchannels (not shown). One subchannel is provided for and dedicated to each input/output device accessible to the channel subsystem. A subchannel provides the logical appearance of a device to the program. Each subchannel provides information concerning the associated input/output device 110 and its attachment to channel subsystem 106. The subchannel also provides information concerning input/ output operations and other functions involving the associated input/output device.

Channel subsystem 106 is coupled via one or more serial links 118 to one or more control units 108. Each control unit provides the logic to operate and control one or more input/output devices and adapts, through the use of common facilities, the characteristics of each input/output device to the link interface provided by the channel. The common facilities provide for the execution of input/output operations, indications concerning the status of the input/ output device and control unit, control of the timing of data transfer over the channel path and certain levels of input/ output device control.

Each control unit 108 is attached via a bus 124 to one or more input/output devices 110. In one embodiment, each control unit may be attached up to 256 input/output devices. Input/output devices 110 receive information from or store information in main storage 102. Examples of input/output devices include card readers and punches, magnetic tape units, direct access storage devices (DASD), displays, keyboards, printers, teleprocessing devices, communication controllers and sensor-based equipment.

The computer environment described above is only one example of a computer environment that can incorporate and use the recovery capability of the present invention. The recovery capability of the present invention is equally applicable to other types of architectures, as well as to other types of environments. For instance, the recovery capability of the present invention can be included and used in a System Processing Complex (SYSPLEX) that includes two or more computer systems coupled to one another via, for example, a coupling facility. The recovery capability of the present invention is applicable to any type of system/environment that can benefit from such a capability.

In order to provide the recovery capability of the present invention, the operating system employs various control blocks. These control blocks are constructed by the operating system (e.g., the Input/Output Supervisor (IOS) of the MVS operating system) using the self-description data from the I/O devices. The control blocks are stored in memory (e.g., local cache, main storage), and include, for instance, one or more Unit Control Blocks (UCBs) 200 (FIG. 2), one or more Subsystem Control Blocks (SSCBs) 202, one or more Control Unit Blocks 206, one or more Device Control Blocks 208, and one or more Node Element Qualifiers, 210, each of which is described below.

Figure 2:
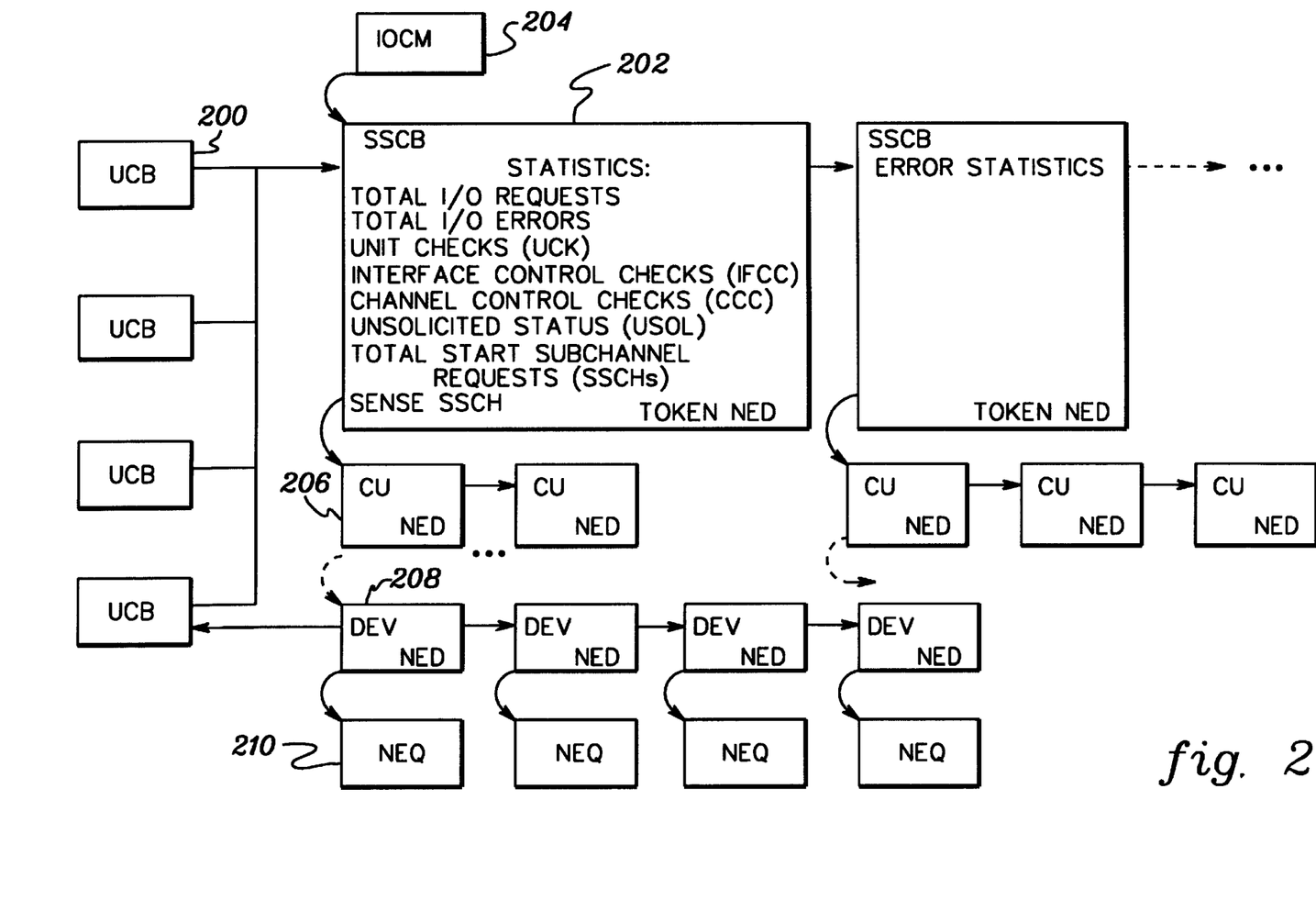
FIG. 2 illustrates one example of a configuration of one or more subsystems of the computer environment of FIG. 1, in accordance with the principles of the present invention.

Each Unit Control Block 200 contains information about an I/O device 110. This information includes, for instance, an identifier of the subsystem to which the device belongs. One or more I/O devices may belong to the same subsystem, and each device has its own Unit Control Block. Each UCB points to its associated Subsystem Control Block.

In the example depicted in FIG. 2, each of the UCBs belongs to the same subsystem and thus, references the same SSCB. The additional SSCB depicted (and any other SSCBs of the computer environment) would have other input/output devices (and thus, other UCBs) associated therewith.

The Subsystem Control Blocks of a computer environment form a chain of one or more SSCBs. Each SSCB points to the next SSCB in the chain, while the last SSCB points to null. The beginning of the SSCB chain is pointed to by a pointer located in an I/O Communication Area (IOCM) 204. Further, each Subsystem Control Block 202 is referenced by its corresponding UCB.

In one example, each Subsystem Control Block 202 contains information pertinent to the subsystem corresponding thereto. For instance, it includes a Token Node Element Descriptor (TNED) uniquely identifying the SSCB, and various statistics for the subsystem, which are used in accordance with the principles of the present invention.

The various statistics include, for instance, a number of requests issued for the subsystem (Total I/O Requests), a number of those requests that resulted in an error (Total I/O Errors), a number of unit checks (UCK), a number of interface control checks (IFCC), a number of channel control checks (CCC), a number of unsolicited status errors (USOL), a number of Start Subchannel Requests (SSCHs) issued to devices of the subsystem, and a number of Start Subchannel Requests issued to retrieve sense data (Sense SSCH). There may also be other error conditions that are tracked. Each of these counts is maintained by the operating system, and in particular, by the Input/Output Supervisor (IOS) component of the operating system.

In addition to the above, each SSCB has a pointer to a chain of one or more Control Unit Blocks 206 associated with the subsystem. Each Control Unit Block has a Node Element Descriptor (NED) identifying the associated control unit. The Control Unit Blocks, in turn, may point to other control blocks associated with additional system components (as indicated by . . . in FIG. 2), and those control blocks then reference I/O device blocks 208. Alternatively, the Control Unit Blocks may reference I/O device blocks 208 directly.

In the hierarchy shown in FIG. 2, the first I/O device block in a chain of one or more device blocks is referenced, and that device block includes a pointer to the next device block on the chain, and so forth. Each of the device blocks shown in FIG. 2 is coupled to the first Control Unit Block. Each of the other Control Unit Blocks may have one or more other device blocks associated therewith.

In addition to the above, each device block has a pointer back to its associated UCB. Further, each device block also has a pointer to a Node Element Qualifier (NEQ) 210, which contains configuration information. The Node Element Qualifier includes a Device Dependent Time Out (DDTO), which indicates the maximum time that the associated I/O device takes to perform its internal error recovery.

The hierarchy depicted in FIG. 2 represents a data structure referred to as a Configuration Data Table (CDT). The CDT is explained in further detail in commonly assigned U.S. Pat. No. 5,197,069, Cook et al., entitled "Method and System For Detecting and Recovering From Switching Errors", Issued Mar. 23, 1993, which is hereby incorporated herein by reference in its entirety.

The above control blocks and the information located therein are used during the recovery capability of the present invention, as described with reference to FIGS. 3–8. The logic within those FIGS. is performed by, for example, the operating system (e.g., IOS).

Figure 3:
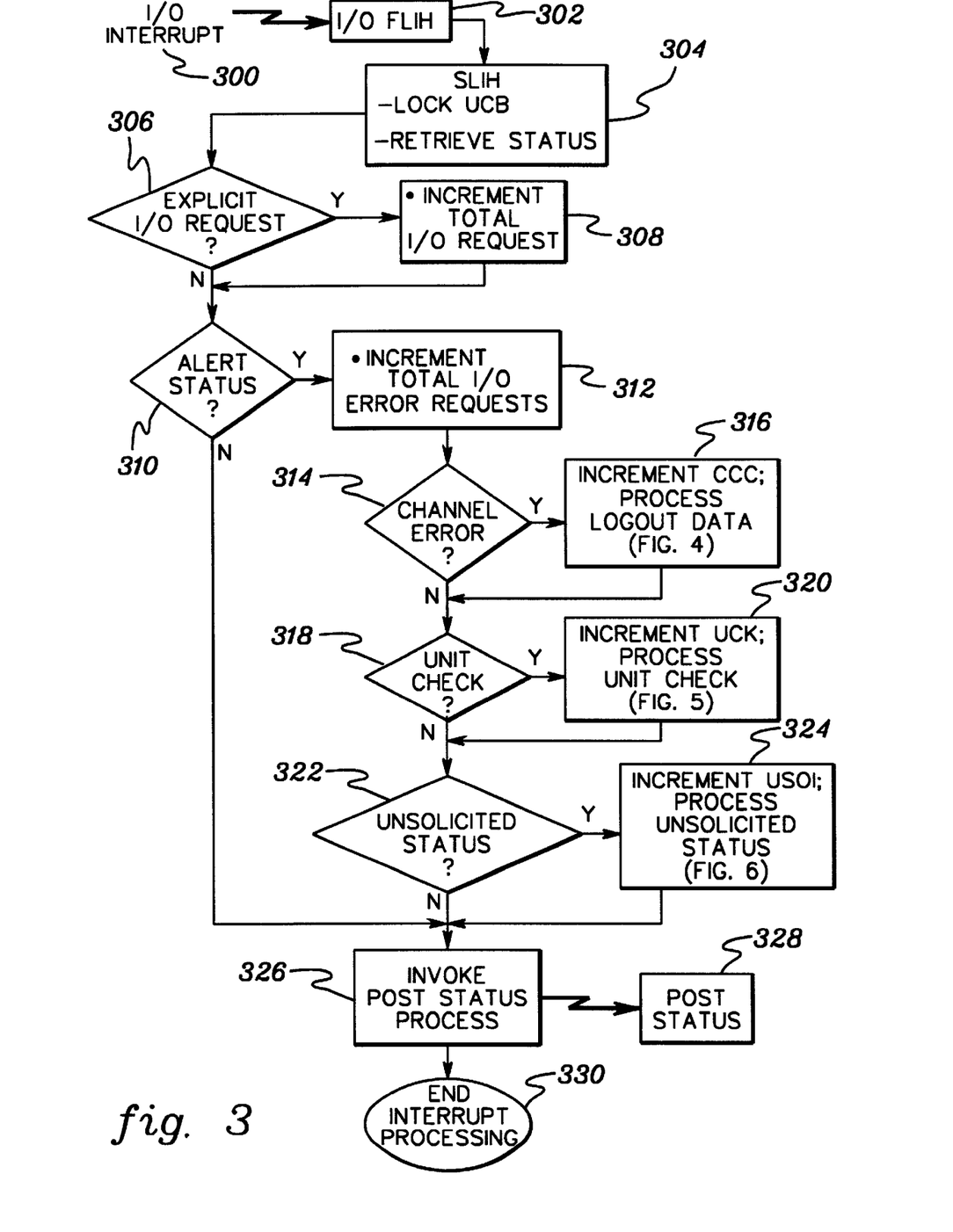
FIG. 3 depicts one embodiment of the logic associated with a recovery procedure invoked by an I/O interrupt, in accordance with the principles of the present invention.

FIG. 3 describes the processing that occurs when an I/O interrupt is received by the operating system software. In particular, the operating system keeps track of the total number of interrupts received by the operating system for a particular subsystem, and how many of those interrupts represent errors. When a predefined error threshold is met for a subsystem and when shortage of a critical resource exists, recovery action is taken. The type of recovery action taken is dependent on the type of error(s) that caused the interrupt, as explained below.

Referring to FIG. 3, initially an I/O interrupt is received by the operating system from the hardware, such as from an I/O device, STEP 300. When the I/O interrupt is received, an I/O First Level Interrupt Handler (FLIH) receives control, STEP 302. This First Level Interrupt Handler performs some initialization and passes control to an I/O Second Level Interrupt Handler (SLIH), STEP 304.

FLIH and SLIH processing is described in detail in IBM Publication No. ZZ28-7035-02, "MVS/SP Version 4 Component Logic: IOS", March 1993, which is hereby incorporated herein by reference in its entirety.

The Second Level Interrupt Handler obtains a lock for the Unit Control Block, which represents the interrupting device, and retrieves status of the device's I/O operation. The status retrieval is performed via, for instance, a Test Subchannel Instruction, which stores the retrieved information in an Interruption Response Block (IRB).

The Interruption Response Block includes information that indicates the status of the I/O device and subchannel associated therewith. As one example, the IRB includes an alert status bit that indicates when an error condition exists. One example of the Interruption Response Block and the Test Subchannel Instruction are described in "Enterprise Systems Architecture/390 Principles of Operation", which has been incorporated herein by reference in its entirety.

The Interruption Response Block is then passed to a set of routines that analyze the status of the I/O request that caused the interrupt. For example, a determination is made as to whether the interrupt is in response to an explicit I/O request (solicited), INQUIRY 306. That is, in one example, if the alert status bit in the IRB is on, and a primary status bit and a secondary status bit in the IRB are off, then the interrupt is unsolicited.

If the interrupt is the result of a solicited request, then the total count of I/O requests for the subsystem that contains the interrupting device is incremented by one, STEP 308.

Thereafter, or if the request was not solicited, IRB processing continues with a determination as to whether alert status is present, INQUIRY 310. This determination is made by checking the alert status bit located within the Interruption Response Block. If the alert status bit is set, this indicates that some unusual condition has occurred that requires special handling, in accordance with the principles is of the present invention. The type of handling that occurs depends on the type of error that was encountered, as described in further detail below.

When alert status is present, the total number of I/O error requests for the subsystem containing the interrupting I/O device is incremented by one and stored in the Subsystem Control Block representing that subsystem, STEP 312.

Thereafter, a determination is made as to whether the error causing the interrupt is a channel error, INQUIRY 314. This determination is made by checking an indicator within the Interruption Response Block (e.g., the "L" bit). If the error is a channel error, then the number of channel control checks (CCC) in the SSCB is incremented by one and logout data is processed in a manner described with reference to FIG. 4, STEP 316.

Figure 4:
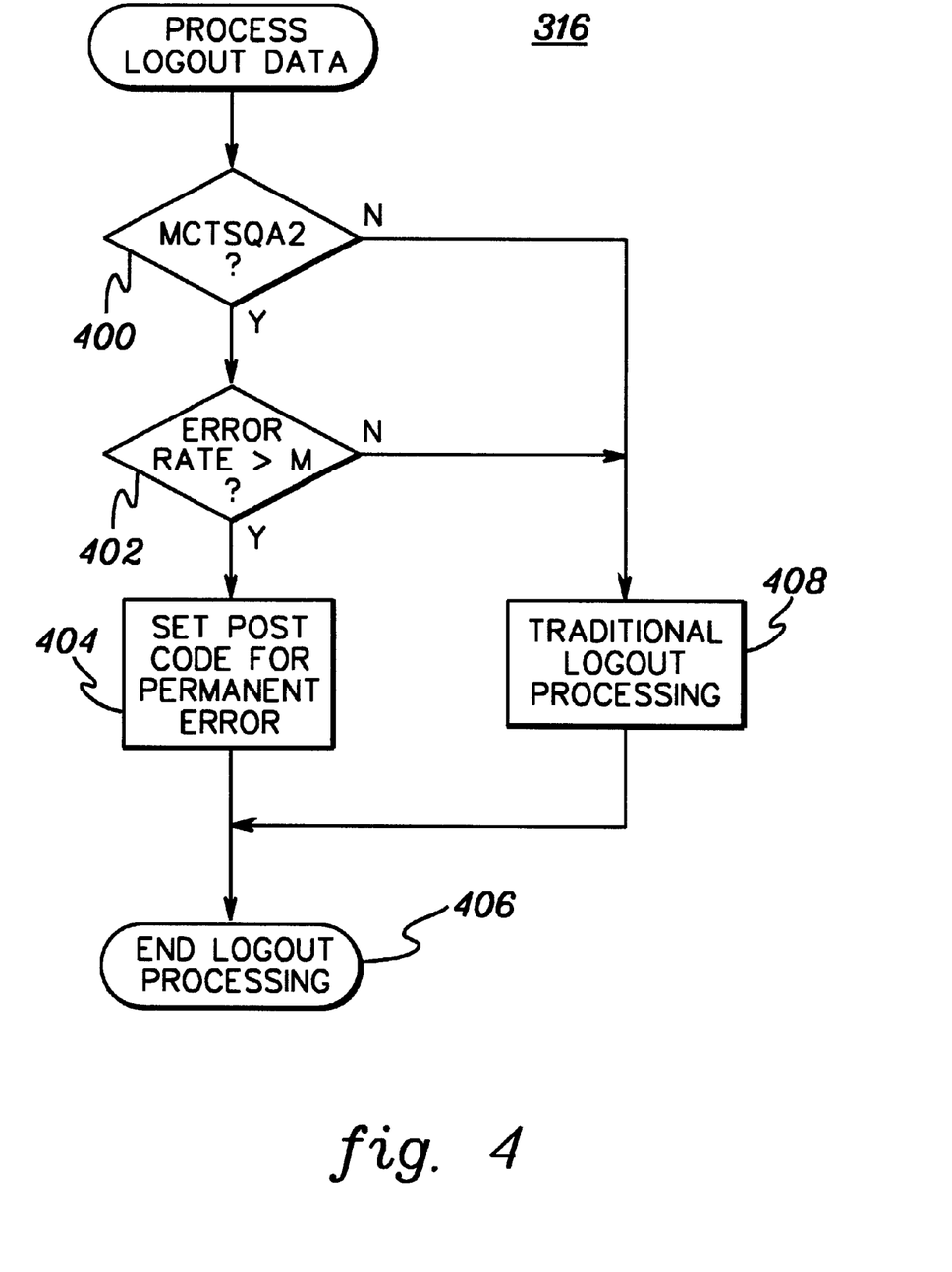
FIG. 4 depicts one embodiment of the logic associated with processing logout data when the I/O interrupt of FIG. 3 is caused by a channel error, in accordance with the principles of the present invention.

Referring to FIG. 4, initially, a check is made to determine whether a critical shortage of a system resource exists, INQUIRY 400. In one example, the resource being checked is storage, and in particular, a System Queue Area (SQA) of storage. Thus, in order to make this determination, an indicator within a Storage Management Control Table (MCT), referred to as MCTSQA2, is checked to determine if it is set. When it is set, a critical shortage of storage is recognized. (In one example, the bit is set by the System Resource Manager (SRM) component of MVS based on the amount of storage physically in the machine, how much of it is requested by the system programmer, and how much is needed by the operating system. The MCT and its indicators are described in detail in IBM Publication No. SY28-1166-04, "OS/390 MVS Data Areas Vol 3 (IVT-RCWK), March 1998, which is hereby incorporated herein by reference in its entirety.)

If a critical shortage of storage has occurred, then the objective is to avoid exacerbating the situation by not consuming additional storage (e.g., SQA) for the I/O devices that have a high error rate. However, if the I/O devices are operating normally and do not have a high error rate, then processing should continue as normal.

Thus, a determination is made as to whether the subsystem containing the interrupting device has an error rate exceeding an error threshold M (e.g., 25%), INQUIRY 402. The error rate is defined as (UCK+CCC+IFCC+USOL)/(TOTAL SSCHs−SENSE SSCH),
where:

UCK is the number of unit checks for the subsystem;

CCC is the number of channel control checks for the subsystem;

IFCC is the number of interface control checks for the subsystem;

USOL is the number of unsolicited errors for the subsystem;

Total SSCHs is the number of Start Subchannel Requests for the subsystem; and

Sense SSCH is the number of Start Subchannel Requests for sense data for the subsystem.

(The above error rate definition is only one example. More, less or different error conditions may be accounted for in an error rate definition.)

If the error rate is greater than the threshold and there is a critical shortage situation, then a permanent error condition is set for the I/O request, STEP 404. In particular, a post code indication is set in a control block that represents the I/O request (e.g., the Input/Output Supervisor Block (IOSB)). This is accomplished without requiring a large block of additional storage. The setting of the permanent error indicates to the requestor of the I/O request not to do any retries or recovery. The requester simply fails. Thereafter, logout processing is complete, STEP 406.

Returning to INQUIRY 400, if there is no critical shortage, then traditional logout processing is performed, STEP 408. This includes moving data (e.g., model-dependent data) out of the Interruption Response Block into a block of storage that is obtained, and logging such event into a log file (e.g., SYS1.LOGREC). Traditional logout processing is described in further detail in IBM Publication No. ZZ28-7035-02, "MVS/SP Version 4 Component Logic: IOS", March 1993, which is hereby incorporated herein by reference in its entirety.

Similarly, if the error rate for the subsystem does not exceed the error threshold, INQUIRY 402, then traditional logout processing is performed, STEP 408. Thereafter, logout processing is complete, STEP 406.

When logout processing is complete, flow passes back to FIG. 3, STEP 316. Thereafter, or if the error causing the interrupt is not a channel error, then a determination is made as to whether the error is a unit check, INQUIRY 318. This determination is made by checking an indicator within the Interruption Response Block. If the error is a unit check error, then the number of unit checks in the SSCB is incremented by one and the unit check is processed in a manner described with reference to FIG. 5, STEP 320.

Figure 5:
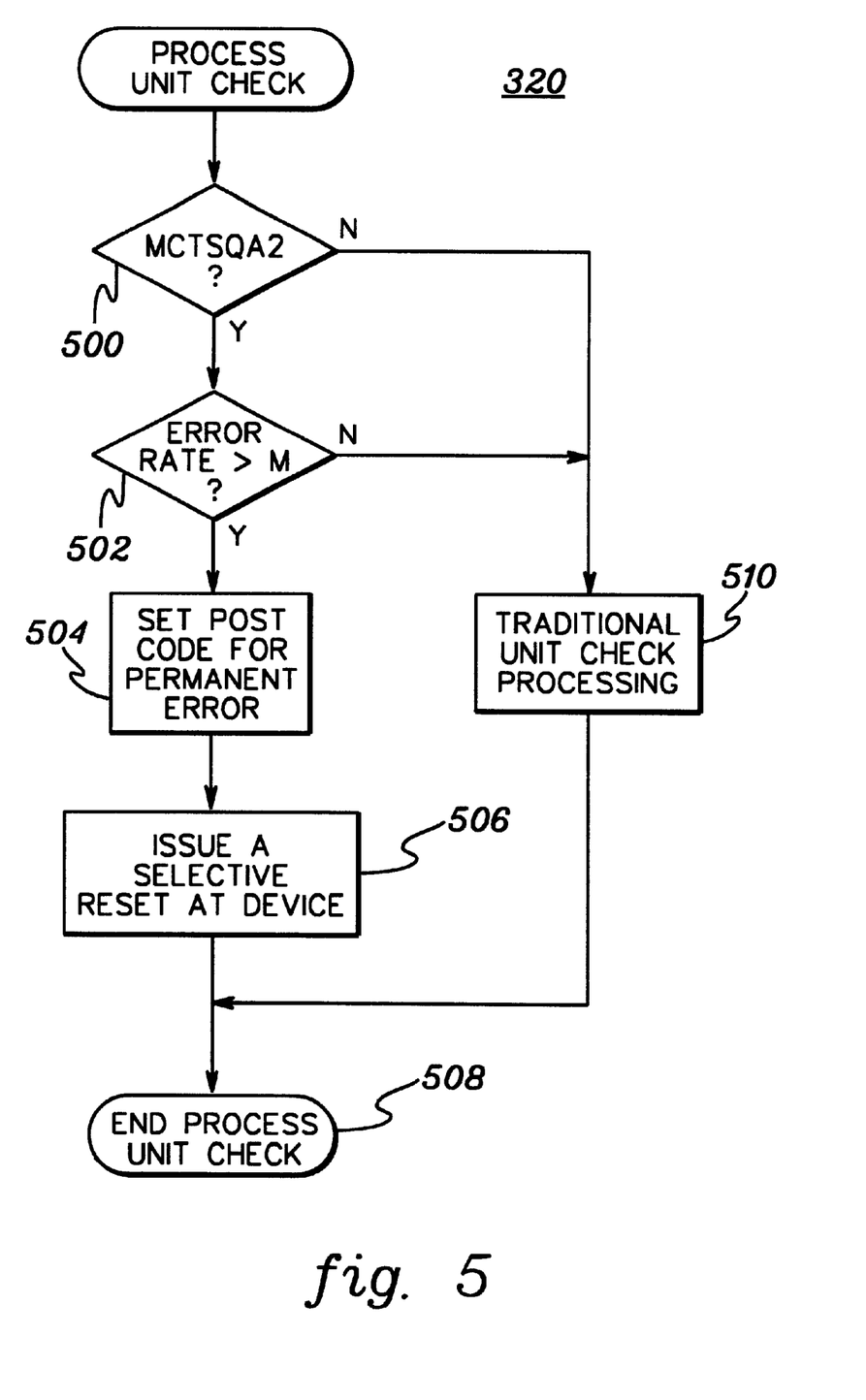
FIG. 5 depicts one embodiment of the logic associated with processing unit checks when the I/O interrupt of FIG. 3 is caused by a unit check, in accordance with the principles of the present invention.

Referring to FIG. 5, initially, there is a check to determine whether a critical shortage of a resource (e.g., SQA) has occurred, as described above, INQUIRY 500. If a critical shortage of storage has occurred, then a determination is made as to whether the subsystem containing the interrupting device has an error rate exceeding an error threshold M (e.g., 25%), INQUIRY 502.

When the error rate is greater than the threshold and there is a critical shortage situation, then, as described above, a permanent error condition is set for the I/O request, STEP 504. Thereafter, a selective reset is issued to the interrupting device via, for instance, a Clear Subchannel Instruction (CSCH) in order to clear a dedicated allegiance preventing other sharing systems from accessing the same device, STEP 506. The Clear Subchannel Instruction is described in the "Enterprise Systems Architecture/390 Principles of Operation" incorporated by reference in its entirety, above.

The setting of the permanent error and the issuing of the selective reset does not require a large block of additional storage. Thus, the shortage situation is not exacerbated. Subsequently, the unit check processing is complete, STEP 508.

Returning to INQUIRY 500, if a critical shortage has not occurred, then traditional unit check processing is performed, STEP 510. This includes obtaining a block of storage (exacerbating the situation), reading the sense data, and sending it to an error recovery procedure, as described in detail in IBM Publication No. ZZ28-7035-02, "MVS/SP Version 4 Component Logic: IOS", March 1993, which is hereby incorporated herein by reference in its entirety.

Similarly, if the error rate for the subsystem is less than or equal to the threshold, INQUIRY 502, then traditional unit check processing is performed, STEP 510.

After performing the traditional processing, the unit check process is complete, STEP 508, and flow returns to FIG. 3, STEP 320. Thereafter, or if the error is not a unit check, then a determination is made as to whether the error is an unsolicited status error, INQUIRY 322. In one example, this determination is made by looking at various indicators in the Interruption Response Block. Particularly, if the primary and secondary indicators are off and the alert status indicator is on, then an unsolicited error has resulted.

Figure 6:
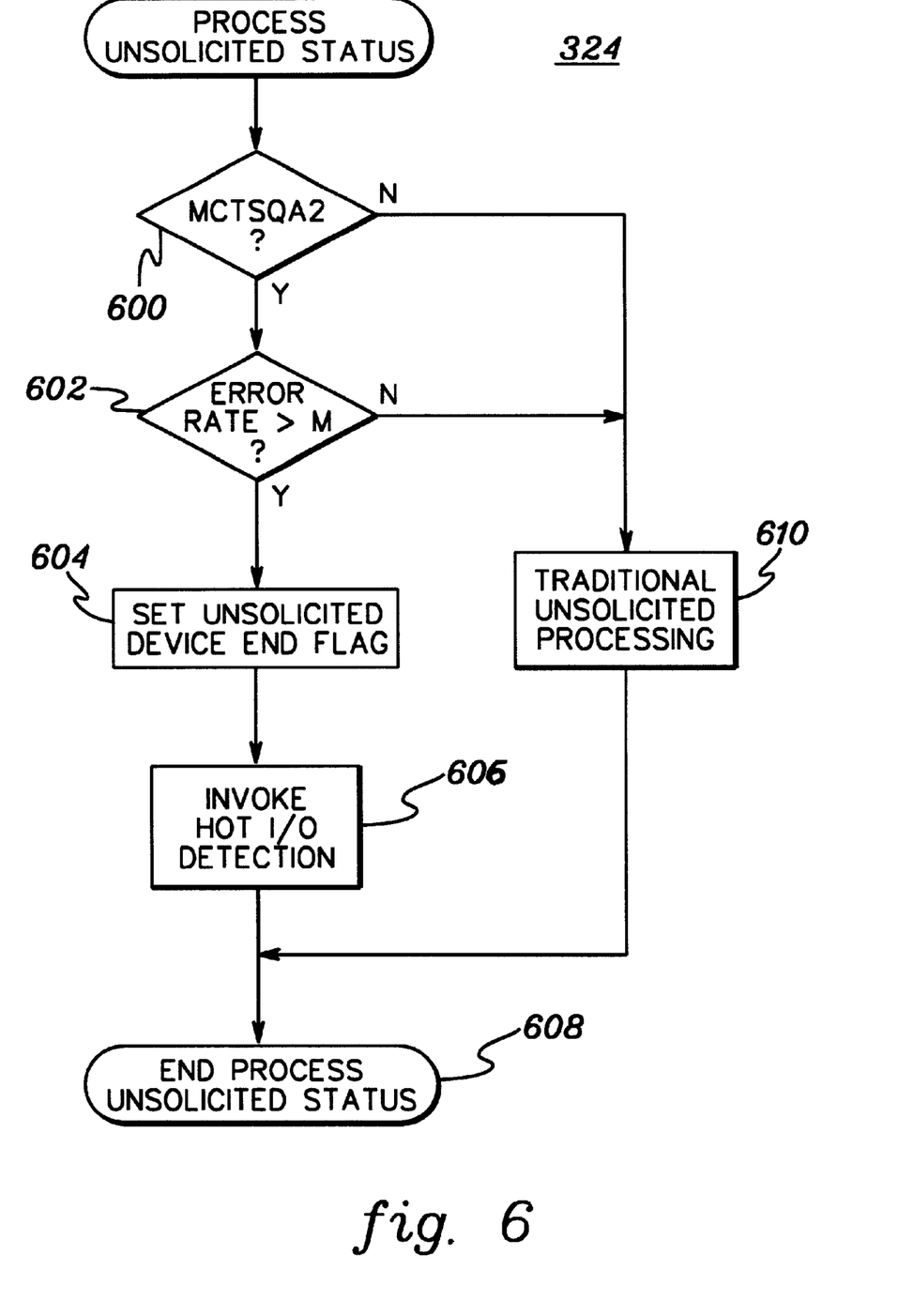
FIG. 6 depicts one embodiment of the logic associated with processing unsolicited status errors when the I/O interrupt of FIG. 3 is caused by an unsolicited status error, in accordance with the principles of the present invention.

When the error is an unsolicited status error, then the number of unsolicited status errors (USOL) is incremented by one and the error is processed in the manner described with reference to FIG. 6, STEP 324. Referring to FIG. 6, initially, there is a check to determine whether a critical shortage of a resource (e.g., storage and, in particular, SQA) has occurred, as described above, INQUIRY 600. If a critical shortage has occurred, then a determination is made as to whether the subsystem containing the interrupting device has an error rate exceeding an error threshold M (e.g., 25%), INQUIRY 602.

When the error rate is greater than the threshold and there is a critical shortage situation, then an unsolicited device end indicator within the UCB for the interrupting device is set, STEP 604. This indicator specifies that an unsolicited device end has been encountered.

Thereafter, a hot I/O detection procedure is invoked, STEP 606. This procedure invokes hardware isolation routines to, for instance, disable channel paths, as explained in detail in IBM Publication No. ZZ28-7035-02, "MVS/SP Version 4 Component Logic: IOS", March 1993, which is hereby incorporated herein by reference in its entirety. The setting of the device end flag and the invoking of the hot I/O detection procedure does not require obtaining a large block of additional storage. Thus, the shortage situation is not exacerbated. This concludes processing of the unsolicited status, STEP 608.

Returning to INQUIRY 600, if there is no critical shortage of resources, or if the error rate is equal to or less than the threshold, INQUIRY 602, then traditional unsolicited processing is performed, STEP 610. This includes obtaining a block of storage, invoking device dependent routines and erasing operator messages, as described in detail in IBM Publication No. ZZ28-7035-02, "MVS/SP Version 4 Component Logic: IOS", March 1993, which is hereby incorporated herein by reference in its entirety.

Thereafter processing of the unsolicited status is complete, STEP 608, and the logic returns to STEP 324 (FIG. 3).

After completing the unsolicited status processing, or if there is no unsolicited status error, STEP 322, post status processing is invoked, STEP 326. Post status processing asynchronously provides status to the I/O requestor (e.g., a piece of work, such as a task or application, or a Service Request Block (SRB)), STEP 328. This status is dependent on the type of errors. For example, if a channel error or unit check caused the interrupt, then the status includes a permanent error condition. However, if an unsolicited error caused the interrupt, then the status indicates that one or more devices were isolated.

Post status processing is also invoked, when the alert status indicator is not set, INQUIRY 310. In this scenario, the status indicates that there is no error. Subsequent to invoking the post status process, the Unit Control Block for the interrupting device is unlocked, and interrupt processing is complete, STEP 330.

Figure 7:
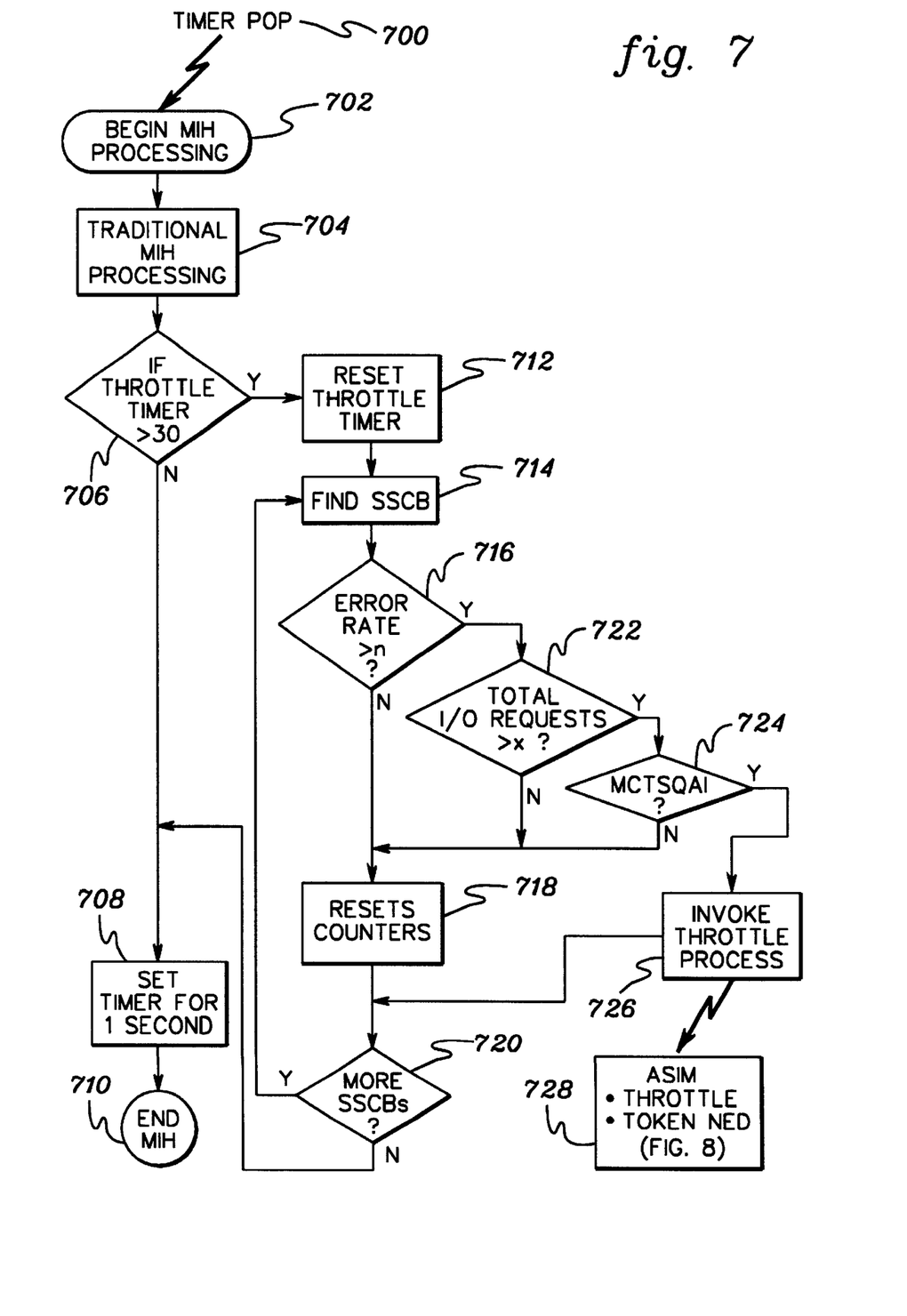
FIG. 7 depicts one embodiment of the logic associated with a recovery procedure invoked by a timer pop, in accordance with the principles of the present invention.
Figure 8:
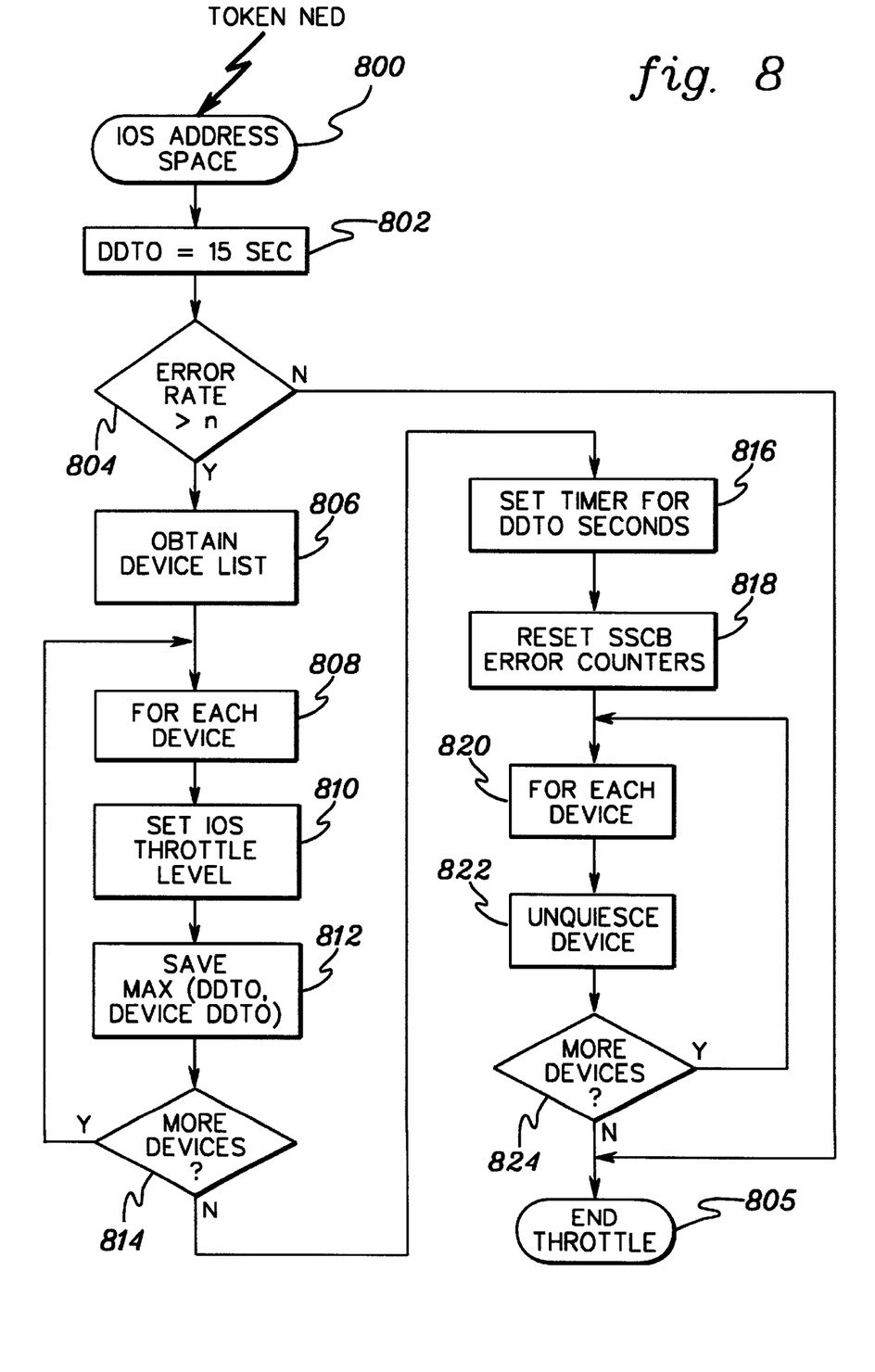
FIG. 8 depicts one embodiment of the logic associated with a throttling technique, which is invoked by the recovery procedure of FIG. 7, in accordance with the principles of the present invention.

In addition to the above interrupt processing in which status is simulated and provided to the requester, the collected data is further examined at regular intervals to determine if one or more actions are to be taken. In particular, at regular intervals (e.g., once every second), processing is performed to determine if there are any missing interrupts and whether a missing interrupt handler (MIH) needs to perform recovery. Additionally, once every few MIH timer pops (e.g., once every 30 seconds), all of the Subsystem Control Blocks are examined to determine if there are any high error rates for any of the subsystems. If there are high error rates and there is a potential storage shortage, a process is invoked to slow down I/O activity (i.e., throttling). This processing is described below with reference to FIGS. 7–8. The logic of FIGS. 7–8 is performed by the operating system. In one example, in MVS, the logic is performed by the IOS component of the operating system.

Referring to FIG. 7, once every second, the timer pops for the missing interrupt handler, STEP 700. This wakes up the missing interrupt handler process, so that it can begin traditional processing, STEP 702. Traditional missing interrupt handler processing includes, for instance, looking for missing interrupts (an I/O interrupt that has not occurred within a predefined amount of time), issuing a Clear Subchannel Instruction, resetting the device associated with the missing interrupt, starting a process to test the device to see if it was hung, starting a process to attempt to asynchronously read the state of the channel paths, and reinitiating the request, STEP 704. This traditional processing is described in detail in commonly assigned U.S. Pat. No. 5,388,254, Betz et al., entitled "Method and Means For Limiting Duration of Input/Output (I/O) Requests", Issued on Feb. 7, 1995, which is hereby incorporated herein by reference in its entirety.

In addition to the traditional MIH processing, every 30 seconds, as one example, all of the Subsystem Control Blocks of the computer environment are examined to determine if recovery should be invoked, in accordance with the principles of the present invention. Thus, a determination is made as to whether a throttle timer (e.g., a count) is greater than 30 seconds, INQUIRY 706. If the throttle timer is less than or equal to 30 seconds, then the timer for the missing interrupt handler is reset to 1 second, STEP 708, and processing of the missing interrupt handler is complete, STEP 710, until the next timer pop, STEP 700.

However, if the throttle timer is greater than 30 seconds, then the throttle timer is reset (i.e., the count is reset to zero), Step 712, and the first Subsystem Channel Control Block is located, STEP 714. In one example, the first SSCB is located via a pointer within IOCM 204 (FIG. 2).

Using the information stored in the first SSCB, a determination is made as to whether the error rate for the subsystem is greater than a predefined threshold N (e.g., 50%), INQUIRY 716. If the error rate does not exceed the threshold, then various counters within the SSCB are reset (e.g., set to zero), STEP 718. These counters include the Total Number of Requests, Total Number of Errors, Unit Checks, Channel Control Checks, Interface Control Checks, Unsolicited Status, Total SSCHs, and Sense SSCH counters described above.

Thereafter, a determination is made as to whether there are more SSCBs to be processed, INQUIRY 720. This determination is made by examining whether the pointer to the next SSCB within the current SSCB is equal to null. If so, then there are no more SSCBs to be processed, and processing continues with STEP 708 "SET TIMER FOR 1 SECOND". However, if there are further SSCBs to be processed, then the flow returns to STEP 714 "FIND SSCB."

Returning to INQUIRY 716, if the error rate for the particular SSCB being examined exceeds the threshold, then a further determination is made as to whether the Total Number of I/O requests (which is maintained in the SSCB) is greater than some predetermined threshold X (e.g., X=# of devices in subsystem multiplied by the # of paths), INQUIRY 722. This check is made to ensure that at least some minimum amount of I/O activity has been requested, and to prevent needless recovery processing.

Should there be less than some minimal amount of I/O requests, then processing continues with STEP 718 "RESET COUNTERS." However, if the Total Number of I/O requests has exceeded the threshold and the error rate has exceeded its threshold, then a determination is made as to whether the computer environment is experiencing a shortage (or potential shortage) of a resource (or resources) that is required for processing the errors, INQUIRY 724. In one example, the resource is storage and the storage shortage is determined by looking at an indicator, referred to as MCTSQA1, located within the Storage Management Control Table (MCT). If this value is set, it indicates that the System Queue Area (SQA) has expanded into the Common Storage Area (CSA) of main storage, signifying a shortage of system memory. (The setting of MCTSQA1 signifies a less critical event than the setting of MCTSQA2. Again, in one example, the bits are set by the System Resource Manager (SRM) component of MVS based on the amount of storage physically in the machine, how much of it is requested by the system programmer, and how much is needed by the operating system.)

If there is no indication of a shortage of system resources, then processing continues with STEP 718 "RESET COUNTERS."

However, when the error rate and Total Number of I/O requests have exceeded their respective thresholds and when there is an indication of a shortage of a system resource, then a process is invoked to throttle (slow down) the number of I/O requests issued to the subsystem having the high error rate, STEP 726. Specifically, the process to perform the throttling is asynchronously scheduled for the subsystem identified by the Token NED, STEP 728. The throttling process is described below with reference to FIG. 8.

Subsequent to invoking the throttling process, flow passes to INQUIRY 720 "MORE SSCBs?". If there are more SSCBs to be processed, then another SSCB is located using the SSCB pointer in the currently processed SSCB, STEP 714. However, if there are no more SSCBs to be processed, then processing continues with setting the MIH timer for 1 second, STEP 708.

The throttling process is described with reference to FIG. 8. During the throttling process, for each device on the subsystem being throttled, the device is quiesced and then, after waiting for a predetermined amount of time, it is unquiesced. This approach attempts to slow down I/O activity before SQA is exhausted, instead of reacting after the exhaustion.

Referring to FIG. 8, the Token NED is passed to the IOS address space, which is to be used during the throttling process, STEP 800. During the process, a default DDTO is set to 15 seconds, as one example, STEP 802. This is the default time for how long I/O activity is to be quiesced.

Thereafter, a determination is made as to whether the error rate for the subsystem identified by the Token NED is greater than the predefined threshold, N, INQUIRY 804. Should the error rate be less than or equal to the threshold, then the throttling process is complete, STEP 805.

However, if the error rate is greater than the threshold, then a list of all of the devices of the subsystem is obtained from the SSCB identified by the Token NED, STEP 806. In particular, the SSCB identifies the first Control Unit Block 206 (FIG. 2) in a chain of one or more Control Unit Blocks associated with the SSCB, and each Control Unit Block either identifies other components that in turn point to the individual devices or itself identifies the first device block in a chain of one or more device blocks. By following this hierarchy, all of the devices associated with the SSCB are identified. (One procedure for obtaining the list of devices associated with a particular SSCB is described in detail in commonly assigned U.S. Pat. No. 5,197,069, Cook et al., entitled "Method and System For Detecting and Recovering From Switching Errors", Issued Mar. 23, 1993, which is hereby incorporated herein by reference in its entirety.

For each device identified, the throttling process continues, STEP 808. Specifically, a device is selected and for that device, a throttle level is set in the UCB corresponding to the device, STEP 810. In particular, the throttle level is set to such a level that all I/O activity that does not have an equal or higher level is stopped. That is, normal I/O activity of the I/O device is quiesced. (In one embodiment, the devices being throttled do not contain system datasets, such as, for example, SYSRES.)

In addition to the above, for that device, the maximum value between the Device Dependent Time Out (DDTO) specified in the Node Element Qualifier associated with the device (Device DDTO) and the default DDTO is selected, STEP 812. The maximum of these values is then saved as the default DDTO to be compared to other Device DDTOs later in the processing.

Thereafter, if there are more devices in the list, INQUIRY 814, processing continues at STEP 808, as described above. Then, when the throttle level has been set for each device, and the maximum DDTO for all of the devices is determined, a timer is set for the maximum DDTO, STEP 816. This determines how long to keep the devices of the subsystem quiesced.

After the time interval has elapsed, the various counters in the SSCB, described above, are reset (e.g., to zero), STEP 818. Then, a device is selected, STEP 820, and that device is unquiesced by resetting the throttle level, STEP 822. This is repeated for each of the devices on the list, INQUIRY 824. When there are no more devices to be unquiesced, the throttle process is complete, STEP 805.

The above-described throttling process can be used in general to prevent the obtaining of large blocks of storage for subsystems with a high I/O error rate (even if a SQA shortage is not prevented or if the shortage occurred for a non-I/O related reason). In that scenario, the error rate used is one that is below the error rate used to trigger I/O throttling. For example, the error rate is 40% with a minimum of 256 I/O attempts to the subsystem.

In another embodiment, the above-described throttling process is not invoked. Instead, only the process described with reference to FIGS. 3–6 is invoked. That process attempts to prevent SQA exhaustion and limits permanent I/O errors to the applications accessing the I/O subsystems with the high I/O error rates. This advantageously prevents further SQA depletion once the system has detected a storage problem, thus limiting any outages to those applications and subsystems using the devices in error.

The recovery capability of the present invention provides a statistical approach to the detection of errors with a granularity to a subsystem (e.g., an I/O subsystem). The statistical approach takes into account an error rate, as well as the current state of the computer environment (e.g., is there enough of a critical resource, such as storage). In the above embodiment, the resource being monitored is storage. However, that is only one example. The recovery procedure of the present invention is equally applicable to other system resources, such as CPU time, system enqueues, etc.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of recovering from errors in a computer environment, said system comprising:
    means for determining whether an error rate is above a predefined threshold;
    means for determining whether there is at least a potential shortage of a resource of said computer environment; and
    means for performing a recovery action when said error rate is above said predefined threshold and said at least potential shortage exists.

2. The system of claim 1, wherein said resource is storage.

3. The system of claim 2, wherein said means for determining whether said at least potential shortage exists comprises means for checking a storage indicator indicative of a level of available storage.

4. The system of claim 1, wherein said error rate is associated with a subsystem of said computer environment.

5. The system of claim 4, wherein said subsystem is an input/output subsystem.

6. The system of claim 4, further comprising means for computing said error rate for said subsystem.

7. The system of claim 6, wherein said means for computing comprises:
    means for adding a number of unit checks, a number of channel control checks, a number of interface control checks and a number of unsolicited status checks, experienced by said subsystem, to obtain a first operand;
    means for subtracting any sense Start Subchannel requests of said subsystem from a number of Start Subchannel requests for said subsystem to obtain a second operand; and
    means for dividing said first operand by said second operand to obtain said error rate for said subsystem.

8. The system of claim 4, wherein said recovery action comprises at least one of the following:
    (a) simulating status of an error detected for said subsystem, said simulating being devoid of a need for a large amount of said resource; and
    (b) slowing down activity to said subsystem.

9. The system of claim 8, wherein said slowing down comprises means for quiescing activity to one or more devices of said subsystem.

10. The system of claim 9, further comprising means for resuming activity to said one or more devices, after a predefined amount of time has elapsed.

11. The system of claim 8, wherein said simulating status comprises means for performing one or more functions depending on a type of said error.

12. The system of claim 11, wherein said type of error is a channel error, and wherein said one or more functions comprises indicating a permanent error condition.

13. The system of claim 11, wherein said type of error is a unit check, and wherein said one or more functions comprises indicating a permanent error condition, and issuing a selective reset at a device of said subsystem causing said unit check.

14. The system of claim 11, wherein said type of error is an unsolicited status error, and wherein said one or more functions comprises setting an unsolicited device end indicator, and invoking an isolation routine for a component of said subsystem.

15. The system of claim 14, wherein said component comprises a channel path or a device.

16. The system of claim 1, further comprising means for repeating said determining whether said error rate is above said threshold and said determining of said at least potential shortage at predefined time intervals.

17. A system of recovering from errors in a computer environment, said system comprising:
    means for determining whether an error rate is above a predefined threshold;
    means for determining whether a resource of said computer environment is below a predetermined threshold; and means for performing a recovery action when said error rate is above said predefined threshold and said resource is below said predetermined threshold.

18. The system of claim 17, wherein said recovery action to be performed is based upon a severity level of said predetermined threshold.

19. The system of claim 18, wherein said error rate is for a subsystem and said severity level is indicative of a potential shortage of said resource, and said recovery action comprises slowing down activity to said subsystem.

20. The system of claim 18, wherein said error rate is for a subsystem and said severity level is indicative of a critical shortage of said resource, and said recovery action comprises simulating status of an error detected for said subsystem, said simulating being devoid of a need for a large amount of said resource.

21. A system of recovering from errors in a computer environment, said system comprising:

a processing unit adapted to determine whether an error rate is above a predefined threshold and to determine whether there is at least a potential shortage of a resource of said computer environment; and said processing unit being further adapted to perform a recovery action when said error rate is above said predefined threshold and said at least potential shortage exists.

22. A system of recovering from errors in a computer environment, said system comprising:

a processing unit adapted to determine whether an error rate is above a predefined threshold and to determine whether a resource of said computer environment is below a predetermined threshold; and said processing unit being further adapted to perform a recovery action when said error rate is above said predefined threshold and said resource is below said predetermined threshold.

* * * * *